United States Patent
Stephens et al.

[11] Patent Number: 5,878,934
[45] Date of Patent: Mar. 9, 1999

[54] LOW-PROFILE TAPE DRIVE WITH AN EXTERNAL-ROTOR MOTOR DIRECTLY DRIVING A CARTRIDGE CAPSTAN

[75] Inventors: Fred O. Stephens; Raymond M. Cundiff, Sr., both of Loveland; Kenneth G. Richardson; Jonathan D. Bassett, both of Ft. Collins, all of Colo.

[73] Assignee: Hewlett-Packard Company, Palo Alto, Calif.

[21] Appl. No.: 822,316

[22] Filed: Mar. 21, 1997

[51] Int. Cl.[6] .............................. B65H 20/00; G03B 1/04; G03B 23/02; H02K 9/00

[52] U.S. Cl. ........................ 226/188; 242/340; 242/352.4; 310/60 A

[58] Field of Search ............................. 226/188; 242/340, 242/354, 352.4; 310/60 A, 61

[56] References Cited

U.S. PATENT DOCUMENTS

| | | |
|---|---|---|
| 3,692,255 | 9/1972 | Von Behren . |
| 3,701,911 | 10/1972 | Halerback .............................. 310/61 X |
| 4,137,472 | 1/1979 | Workman .................................. 310/61 |
| 5,210,664 | 5/1993 | Perona . |
| 5,277,352 | 1/1994 | Ohkubo et al. ......................... 226/188 |
| 5,372,321 | 12/1994 | Ohkubo et al. ..................... 226/188 X |
| 5,430,570 | 7/1995 | Takahashi .............................. 310/61 X |
| 5,507,424 | 4/1996 | Kitajima et al. ........................ 226/188 |

OTHER PUBLICATIONS

Alan J. Richards, "Mini data Cartridge: A Convincing Alternative For Low–Cost, Removable Storage", Hewlett–Packard Journal, May 1976, pp. 6–14.

*Primary Examiner*—Michael Mansen
*Attorney, Agent, or Firm*—Augustus W. Winfield

[57] ABSTRACT

A tape drive for a data tape mini-cartridge. Cartridges of interest have an internal capstan for an internal drive belt driven by a drive roller in the tape drive. The tape drive has a drive roller directly on a rotating exterior surface of the motor. In one example embodiment, the motor has an external rotor. In an example embodiment, no part of the motor diameter extends below or above the data cartridge. No intermediate rollers or belts are required. The motor stator is preferably mounted onto a metal support plate for heat conduction from the stator into the support plate. The motor preferably has space between the rotor and the support plate for air to flow into the stator for convection cooling. In addition, the motor rotor preferably includes cooling fins and air flow holes for additional convection cooling. A spring is mounted between the motor support plate and a chassis to provide a force holding the drive roller against the cartridge capstan.

10 Claims, 6 Drawing Sheets

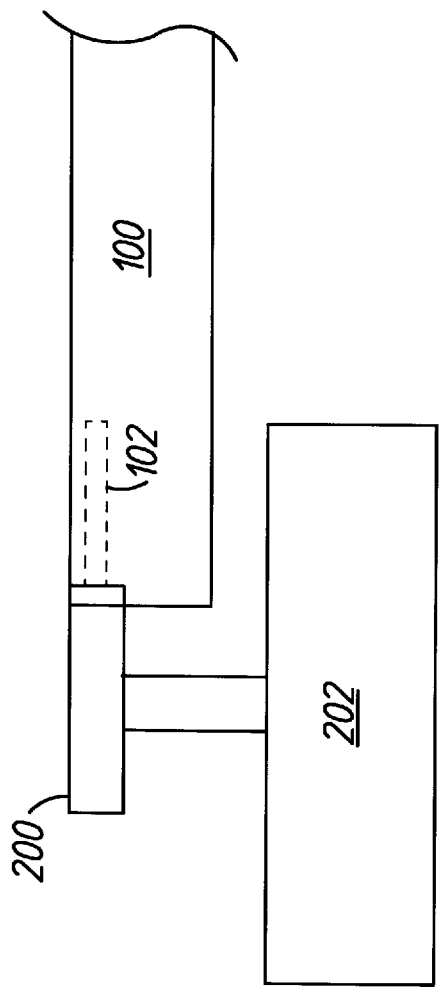
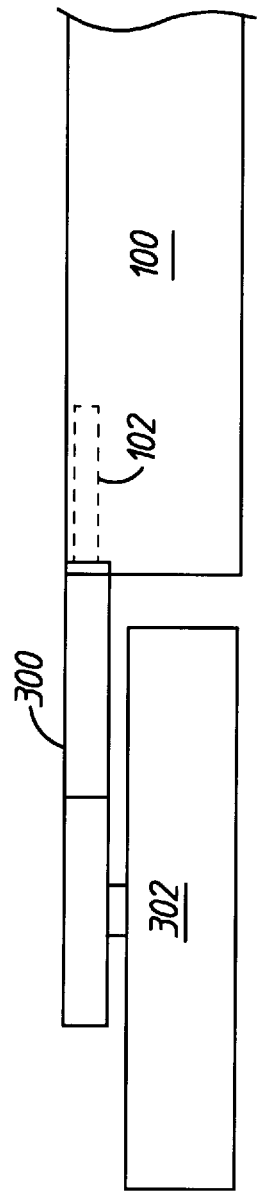
FIGURE 2 (PRIOR ART)
FIGURE 3 (PRIOR ART)

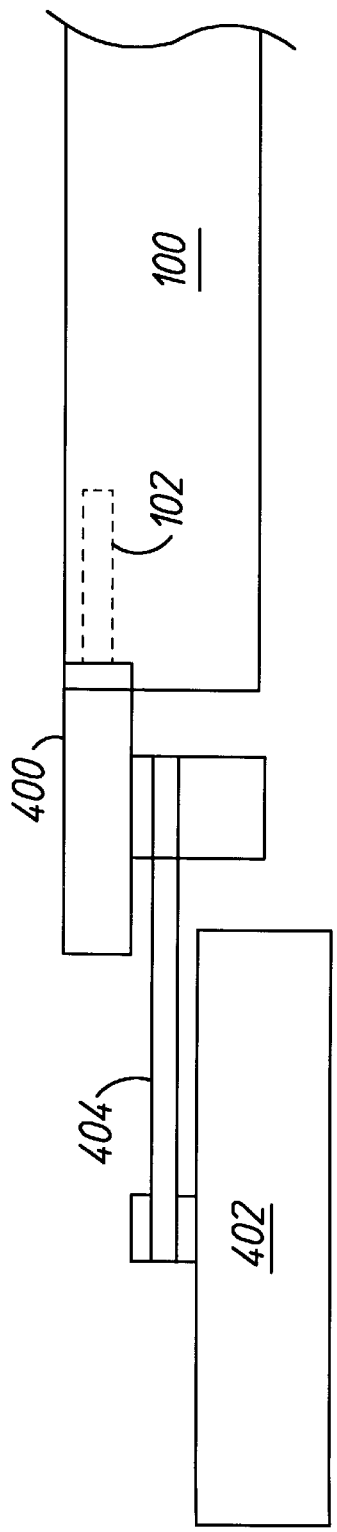
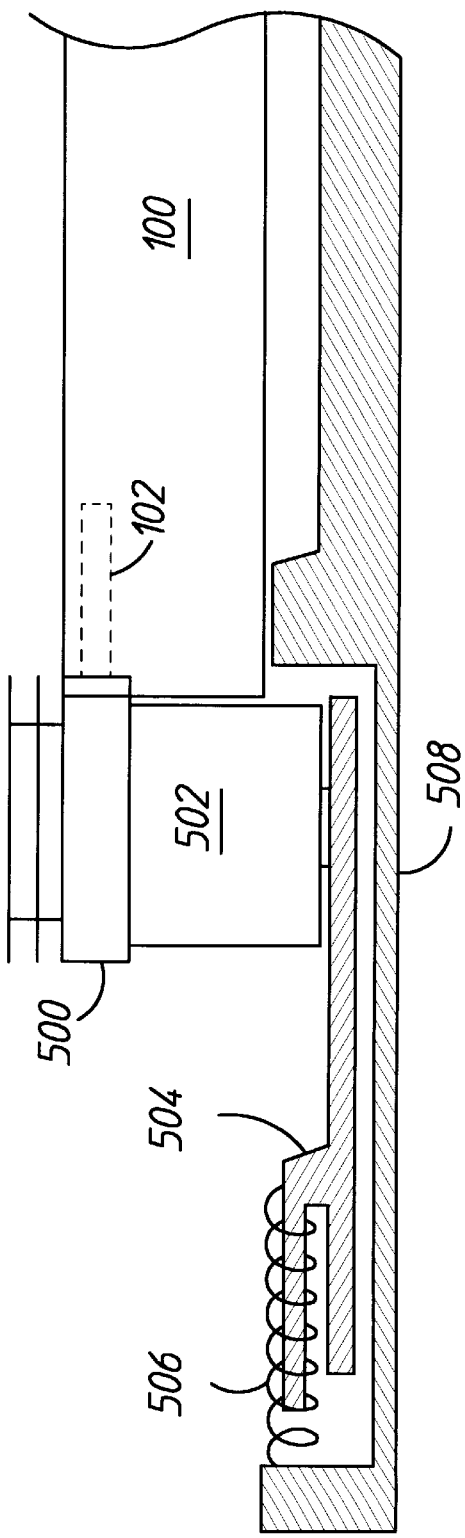

LOW-PROFILE TAPE DRIVE WITH AN EXTERNAL-ROTOR MOTOR DIRECTLY DRIVING A CARTRIDGE CAPSTAN

FIELD OF INVENTION

This invention relates generally to data storage devices and more specifically to cartridge data tape drives.

BACKGROUND OF THE INVENTION

In 1972, a belt driven tape cartridge design (U.S. Pat. No. 3,692,255, issued to Robert A. Von Behren) was introduced for use in the computer industry for digital tape recording. Cartridges commonly in use in 1972 were approximately 100 mm by 150 mm and the magnetic tape was 6.35 mm (0.250 inches) wide. Cartridges of that size and corresponding drive mechanisms are still commercially available. In 1976, smaller data cartridges were developed, as described by Alan J. Richards, *Mini Data Cartridge: A Convincing Alternative for Low-Cost, Removeable Storage*, Hewlett-Packard Journal, May, 1976. The mini-cartridge size is 63.5 mm by 82.5 mm. Versions of the mini-cartridge are commercially available from a variety of vendors with tape widths varying from 3.81 mm (0.150 inches) to 8.00 mm (0.315 inches). There are several commercially available variations that provide a larger volume to accommodate a longer tape. In general, the cartridges are longer and may have a portion that is wider, but the edgewall that provides access to the magnetic tape remains a standard size. The present patent document is concerned with mini-cartridges, and not larger cartridges as disclosed by Von Behren.

All the variations of mini-cartridges described above have two openings in one edgewall. The first opening provides access to the tape by a magnetic head. The magnetic head travels across the width of the tape, transverse to the direction of tape movement, accessing one track at a time for reading or writing. The second opening provides access to a driven roller (capstan) inside the cartridge by an external drive roller (sometimes referred to as a drive puck) in the drive mechanism. The external drive roller is rotated by an electric motor in the drive mechanism. In full height drives, the external drive roller is typically driven directly by a shaft connected to the rotor of a motor. With sufficient drive height, the motor can be positioned so that part of the motor is beneath or above the magnetic head, but outside the range of travel of the magnetic head. However, there is an ongoing market demand for decreasing the size of tape drives, and in particular a market demand for decreasing the height of tape drives. As drive height decreases, there may be a mechanical interference between the drive motor and the magnetic head. The interference problem is made even worse with cartridges having a tape width of 8.00 mm (0.315 inches), increasing the distance the magnetic head has to travel. Therefore, in newer low-profile (shorter height) drives, the drive motor is typically displaced relative to the drive roller and connected to the drive roller by a belt or by an intermediate roller. For example, see U.S. Pat. No. 5,210,664 issued to Mark W. Perona on May 11, 1993. Belts and intermediate rollers add cost and may slip or cause other speed problems. A direct drive is desirable as the lowest cost and most reliable way of connecting the drive motor to the drive roller. A low-profile drive mechanism is needed that has both a directly driven drive roller and room for full movement of the magnetic head.

SUMMARY OF THE INVENTION

A newly available small external-rotor motor enables the rotor to directly drive the capstan in a mini-cartridge. A high-friction flexible band is attached to the motor rotor for improved capstan driving. The diameter of the rotor in the new motor is small enough to enable the flexible band on the rotor to contact the capstan in the cartridge without interfering with the sides of the opening in the cartridge and without interfering with the range of motion of the magnetic head. The length of the motor is such that the motor can stand upright in a low-profile drive.

One particular problem with a high-power motor in a small package is heat dissipation. The internal stator of the motor extends into a metal support plate, with heat conducting to the support plate. There is space between the rotor and the support plate to permit air flow into the stator for convection cooling. Air flow tubes in the rotor force air to flow into the motor near the baseplate, across the stator, and out the other end. Perforated fins attached to the rotor provide additional convection cooling.

BRIEF DESCRIPTION OF THE DRAWINGS

FIG. 2 (prior art) is a side view of an embodiment of the drive of FIG. 1 in a full-height or half-height drive.

FIG. 3 (prior art) is a side view of an embodiment of the drive of FIG. 1 in a low-profile drive with the drive roller driven by an intermediate roller.

FIG. 4 (prior art) is a side view of an embodiment of the drive of FIG. 1 in a low-profile drive with the drive roller driven by a belt drive.

FIG. 5 is a side view of an embodiment of the drive of FIG. 1 in a low-profile drive with a motor/drive-roller arrangement in accordance with the invention.

DETAILED DESCRIPTION OF THE PREFERRED EMBODIMENT OF THE INVENTION

Figure 1:
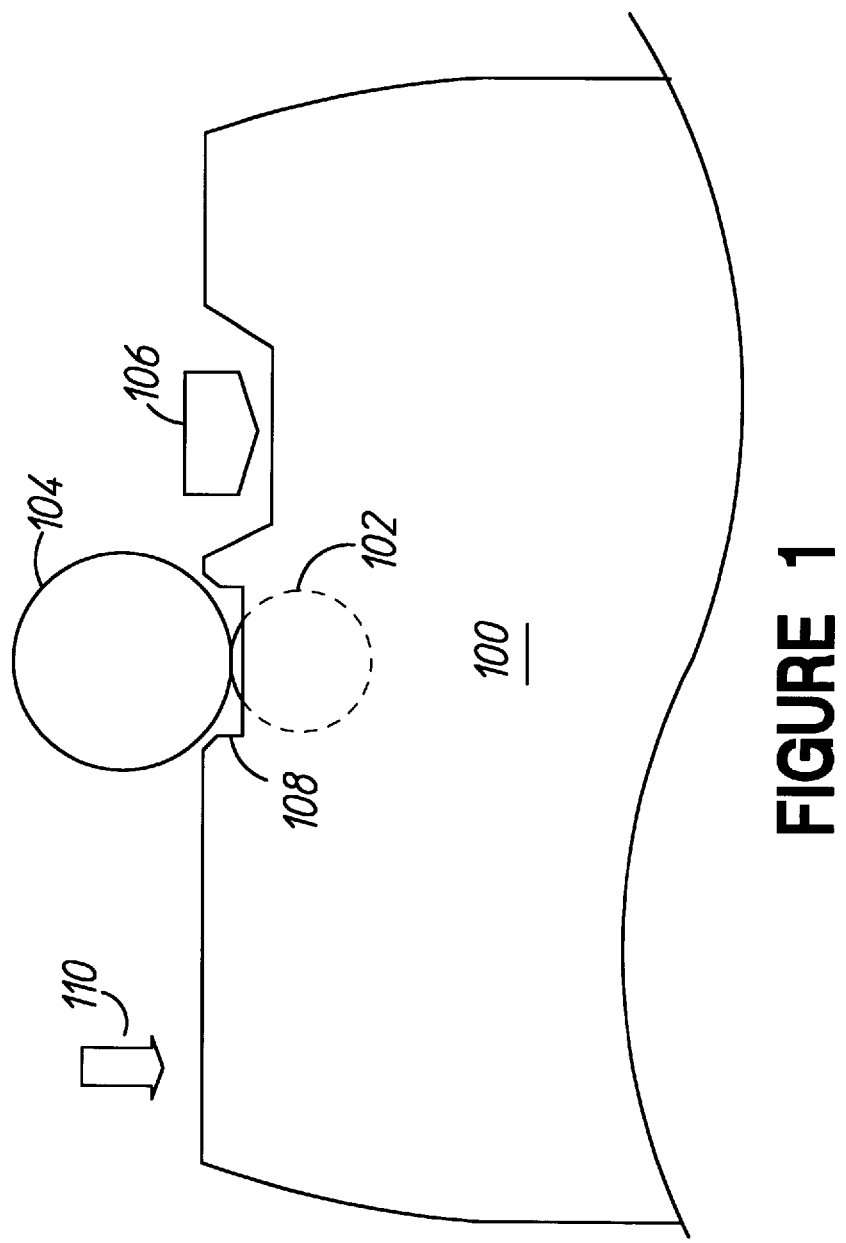
FIG. 1 is a top plane view of drive including a data tape cartridge, a drive roller, and a magnetic head.

FIG. 1 illustrates a portion of a tape drive and a data tape cartridge 100. Tape cartridge 100 has an internal capstan 102 that drives a belt that in turn drives two tape reels (not illustrated). Capstan 102 is driven by an external drive roller 104 in the tape drive. Cartridge 100 also has an opening so that a magnetic head 106 in the tape drive can contact a magnetic tape (not illustrated) in the cartridge. A sensor assembly in the drive in the general area depicted by arrow 110 is required to sense tape cartridge presence, to sense a write-protect lever, and to sense beginning-of-tape and end-of-tape holes. The head 106 in FIG. 1 is simplified for clarity of illustration, and in general, additional support and movement mechanisms are attached to provide precise track-to-track movement. The diameter of the external drive roller 104 is limited by the size of the opening 108 for the cartridge belt capstan 102 and also by the space between the support structure for the head 106 and the sensor assembly.

Commonly adopted standards for mini-cartridges and compatible tape drives are specified by Quarter-Inch Cartridge Drive Standards, Inc. (QIC), 311 East Carrillo Street, Santa Barbara, Calif. 93101. For a commonly available standard mini-cartridge, QIC specifies a maximum diameter for drive roller 104 of 22.2 mm (0.875 inches). This is also close to a practical maximum given the mechanical constraints imposed by the cartridge 100. Various QIC standards also specify the cold-start and running tangential force on the cartridge capstan. The specified cold-start tangential force is 7.5 ounces. The specified running tangential force is 1–5 ounces. For a 22.2 mm drive roller, these tangential forces translate to a motor cold-start torque of 21.6 mNm and running torque of 3.3–15.7 mNm. An industry standard low-profile drive height is approximately 25.4 mm (1.0 inch). In the past, there have been no electric motors available having a diameter less than 22.2 mm, a length less than 25.4 mm, and sufficient torque to meet QIC standards for data cartridges.

FIG. 2 illustrates a prior art full-height or half-height (1.625 inches) tape drive. With sufficient drive height, drive roller 200 can be connected directly to the shaft of a motor 202 with the diameter of the motor lying below (or above) the cartridge 100, without the motor 202 interfering with magnetic head support, magnetic head movement, or sensor assemblies. In modern low-profile drives having a drive height of approximately 25.4 mm (1.0 inch), with mini-cartridges having a height of about 0.5 inch (12.7 mm), there is insufficient space for a motor in a design of the general type depicted in FIG. 2. One prior art solution for driving the drive roller in low profile drives is illustrated in FIG. 3. In FIG. 3, the drive roller 300 is an intermediate roller (with separate support and bearings), and a motor 302 drives the edge of the drive roller 300. FIG. 4 illustrates an alternative prior art solution for driving the drive roller in a low profile drive, in which a motor 402 drives a drive roller 400 (with separate support and bearings) through a belt 404.

FIG. 5 illustrates an assembly for driving a drive roller in a low profile drive in accordance with the invention. In FIG. 5, the rotor 502 of a external rotor motor directly drives capstan 102 via a high-friction band 500. The band 500 can be any high-friction surface, although some flexibility is preferable. No intermediate rollers or drive belts are required. The length of the motor is less than 1.0 inch (25.4 mm). The diameter of the motor is small enough so that the diameter does not need to extend below or above the cartridge (other than the band 500 for driving). An external-rotor motor as depicted in FIG. 5, having a diameter less than 22.2 mm, a length less than 25.4 mm, and sufficient torque to meet QIC standards for data cartridges is now being manufactured by Sony Corporation (part number MX-2097). The configuration of FIG. 5 provides a drive roller for a cartridge belt capstan in which the drive roller is an integral part of a motor, with no support or bearings required other than what is required for the motor. The configuration of FIG. 5 provides substantial space and parts savings over the configurations of FIGS. 3 and 4.

FIG. 5 also illustrates part of a chassis 508. The motor is mounted onto a metal plate 504. A spring 506 biases the metal plate 504 against part of the chassis 508. When cartridge 100 is fully inserted, capstan 102 contacts the high-friction band 500 on the motor, pushing the metal plate 504 away from the chassis stop. The spring 506 then maintains a friction force pushing the high friction band 500 against the capstan 102.

Figure 6:
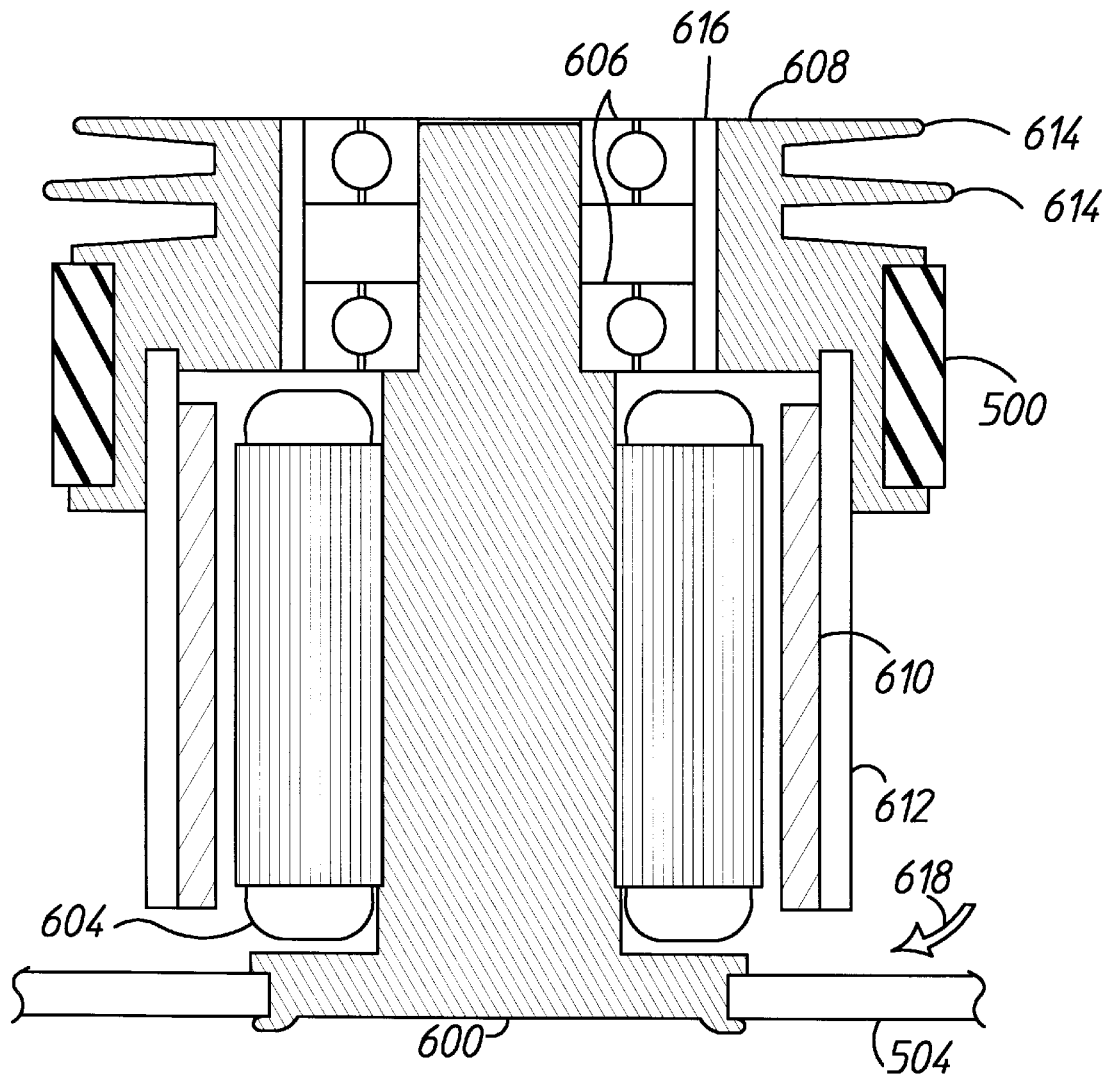
FIG. 6 is a cross-section of the motor of FIG. 5.

FIG. 6 is a cross section of the motor of FIG. 5. In an example embodiment, the motor is a brushless DC permanent magnet motor. In FIG. 6, the stator has a brass base 600, with a flanged portion suitable for mechanically swaging or orbital riveting onto an aluminum support plate 504 (see FIG. 5). The stator includes coils 604 with silicon-steel laminations. The rotor (FIG. 5, 502) includes a housing 608, also made of brass, supported by two sets of ball bearings 606. In the embodiment illustrated in FIG. 6, band 500 is removable urethane rubber band attached to the housing 608. The rotor also includes a steel yoke 612, attached to the housing 608, and neodymium-iron-boron magnets 610. Housing 608 includes cooling fins 614 and air flow holes 616.

In the example embodiment of FIG. 6, the motor is a permanent magnet motor with permanent magnetic poles in the rotor. Variable reluctance (also called switched-reluctance) motors may also be suitable. For a variable reluctance motor, instead of magnets 610 as in FIG. 6, the yoke 612 would include passive formed steel poles or teeth for interaction with electromagnetic stator poles.

One important design consideration for a small high-torque external-rotor electric motor is heat dissipation. For the motor illustrated in FIG. 6, stator heat is partially conducted through the brass base 600 to the aluminum support plate 504. In addition, convection cooling is provided by permitting air to flow between the aluminum plate 504 and the rotor, as depicted by arrow 618, and through the air flow holes 616. In addition, perforated cooling fins 614 provide convection cooling. Note that in an alternative embodiment, one or more cooling fins might have a diameter that exceeds the diameter of the drive roller (thereby partially extending over the data cartridge and head assembly), but the diameter of the magnetic portion of the motor does not extend beyond the diameter of the drive roller.

Figure 7:
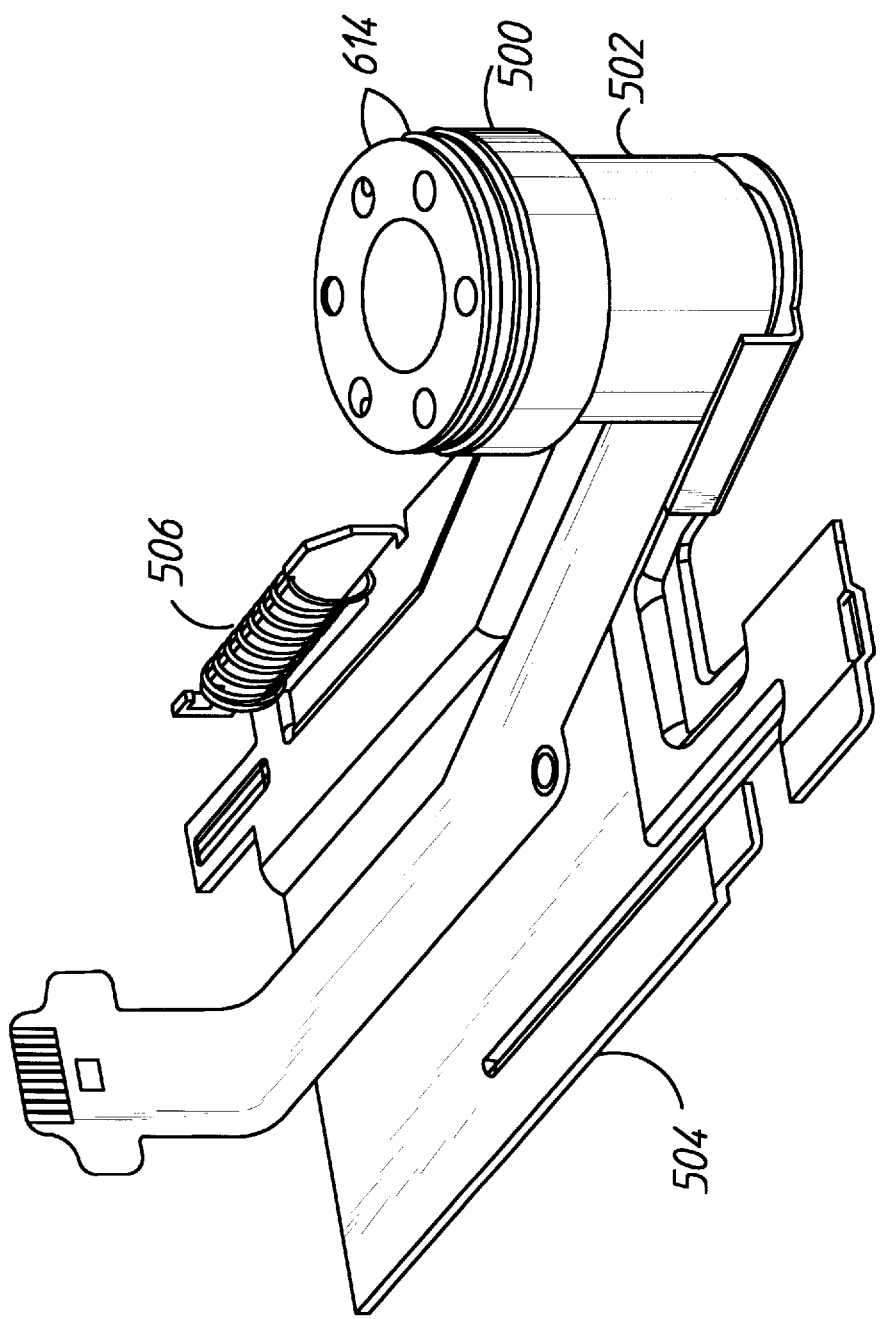
FIG. 7 is a perspective view of the motor of FIGS. 5 and 6 and a support plate.

FIG. 7 illustrates additional detail for a specific embodiment of the support plate 504. In alternative embodiments, extension springs or cantilevered springs could be used instead of spring 506.

Figure 8:
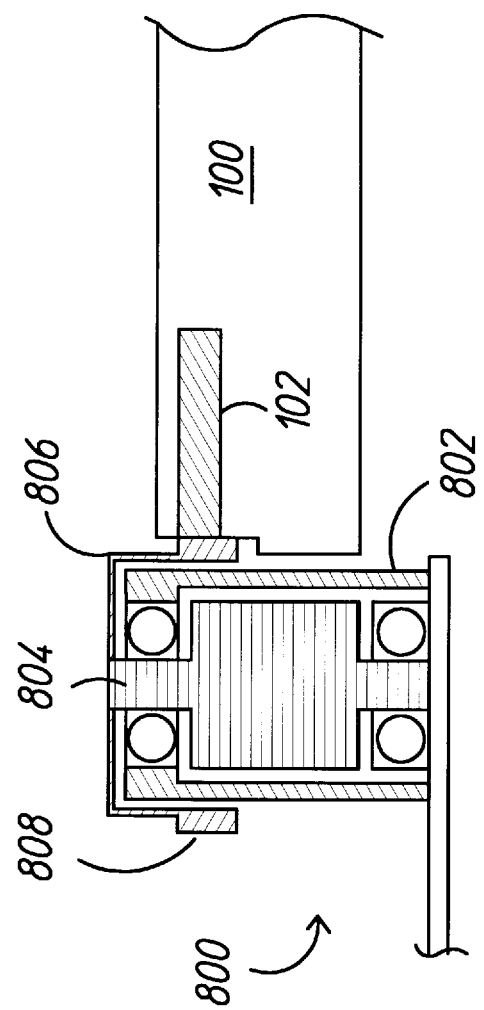
FIG. 8 is a cross-section of an alternative embodiment.

FIG. 8 illustrates an alternative motor embodiment having an internal rotor. In FIG. 8, a motor 800 includes an external stator 802 and an internal rotor 804. The rotor 804 includes a directly attached rotating cap 806 that extends slightly beyond the diameter of the stator. The drive roller 808 is then just a high-friction band on the rotating cap 806. For the motor in FIG. 7, the diameter of the magnetic portion of the rotor 804 does not extend beyond the diameter of the drive roller 808.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A drive for a data tape cartridge, the data tape cartridge having an opening in a front face with an internal capstan protruding into the opening, the capstan of the data cartridge recessed into the data cartridge so that no portion of the capstan extends beyond the front face, the drive comprising:

a motor, the motor having a rotor and a stator;

a first portion of the rotor, external to the stator, having a first diameter, the first diameter sufficiently small so that when the tape cartridge is positioned within the drive for use, the first portion of the rotor protrudes into the opening of the data tape cartridge and directly contacts the capstan of the data tape cartridge without contacting the front face of the data tape cartridge;

a second portion of the rotor, having a second diameter, the second portion being magnetically driven by the stator; and the first diameter at least as large as the second diameter.

2. The drive of claim 1, the second diameter less than 0.875 inches.

3. The drive of claim 1, the motor having an overall length less than 1.0 inches.

4. The drive of claim 1, the first portion of the rotor comprising a high-friction band for making contact with the capstan of the data cartridge.

5. The drive of claim 1 further comprising:

a metal support plate, the motor mounted onto the metal support plate;

a chassis; and a spring between the support plate and the chassis, the spring adapted to force the rotor against the capstan of the data tape cartridge.

6. The drive of claim 5, the stator mounted onto the metal support plate, thereby providing conduction of heat from the motor to the metal support plate.

7. The drive of claim 6, the motor having air flow holes in the rotor suitable for cooling by convection.

8. The drive of claim 1, the rotor including air flow holes that force air past the stator for cooling by convection.

9. The drive of claim 1, the motor having rotating cooling fins for cooling by convection.

10. The drive of claim 1, the second portion of the rotor being external to the stator.

* * * * *